US011167762B2

(12) United States Patent
Ryuzaki et al.

(10) Patent No.: US 11,167,762 B2
(45) Date of Patent: Nov. 9, 2021

(54) VEHICLE TRANSMISSION SYSTEM (71) Applicant: HONDA MOTOR CO., LTD., Tokyo (JP)

(72) Inventors: Tatsuya Ryuzaki, Wako (JP); Junya Ono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 16/625,838

(22) PCT Filed: Mar. 6, 2018

(86) PCT No.: PCT/JP2018/008543
§ 371 (c)(1),
(2) Date: Dec. 23, 2019

(87) PCT Pub. No.: WO2019/003500
PCT Pub. Date: Jan. 3, 2019

(65) Prior Publication Data
US 2020/0122727 A1 Apr. 23, 2020

(30) Foreign Application Priority Data
Jun. 30, 2017 (JP) .............................. JP2017-129317

(51) Int. Cl.
*F16D 48/02* (2006.01)
*B60W 30/18* (2012.01)
(Continued)

(52) U.S. Cl.
CPC ...... *B60W 30/18027* (2013.01); *B60W 10/02* (2013.01); *B60W 10/06* (2013.01);
(Continued)

(58) Field of Classification Search
CPC .......... B60W 30/18027; B60W 10/02; B60W 10/06; B60W 2300/36; B60W 2520/10;
(Continued)

(56) References Cited

U.S. PATENT DOCUMENTS 5,120,282 A   6/1992  Fjallstrom
5,875,679 A   3/1999  Salecker et al.
(Continued)

FOREIGN PATENT DOCUMENTS

CN   1153549    7/1997
CN   1412033    4/2003
(Continued)

OTHER PUBLICATIONS

International Search Report and Written Opinion for International Application Serial No. PCT/JP2018/008543 dated Jun. 12, 2018, 8 pages.
(Continued)

*Primary Examiner* — David J Hlavka
(74) *Attorney, Agent, or Firm* — Amin, Turocy & Watson, LLP (57) ABSTRACT

This vehicle transmission system includes a transmission (21) in which a gear is shifted by an operation of a driver of a vehicle (1), a clutch device (26) that is disposed in a motion transfer path between the transmission (21) and an engine (13) of the vehicle (1), and is disconnected and connected by an action of a clutch actuator (50), and a clutch control unit (61) that is configured to control disconnection and connection of the clutch device (26) by the clutch actuator (50). In a case where the vehicle (1) is started with a gear position of the transmission (21) located at or above a gear that is set in advance, and a vehicle speed (V) is less than or no higher than a set value (v2) that is set in advance, the clutch control unit (61) transitions to clutch capacity-
(Continued)

limiting control in which a clutch capacity is reduced below that during normal clutch control.

7 Claims, 8 Drawing Sheets

(51) Int. Cl.
  *B62J 6/22* (2020.01)
  *B60W 10/02* (2006.01)
  *B60W 10/06* (2006.01)
  *F16D 48/06* (2006.01)
  *F16D 121/04* (2012.01)

(52) U.S. Cl.
  CPC ............... *B62J 6/22* (2020.02); *F16D 25/14* (2013.01); *F16D 48/02* (2013.01); *F16D 48/066* (2013.01); *B60W 2300/36* (2013.01); *B60W 2520/10* (2013.01); *B60W 2710/027* (2013.01); *B60W 2710/0644* (2013.01); *F16D 2121/04* (2013.01); *F16D 2500/10412* (2013.01); *F16D 2500/1117* (2013.01)

(58) Field of Classification Search
  CPC ... B60W 2710/027; B60W 2710/0644; B60W 10/04; B62J 6/22; F16D 25/14; F16D 48/02; F16D 48/066; F16D 2121/04; F16D 2500/10412; F16D 2500/1117; F16D 48/08; F16D 2500/1083; F16D 2500/1026; F16D 2500/50883; F16D 2500/50287; F16D 2500/3108; F16D 2500/30807
  See application file for complete search history.

(56) References Cited

U.S. PATENT DOCUMENTS

| 10,569,756 | B2* | 2/2020 | Tetsuka | ............ B60W 30/18118 |
| 2010/0029441 | A1 | 2/2010 | Tomoda | |
| 2014/0256507 | A1* | 9/2014 | Sakamoto | ........... F16H 61/0437 |
| 2015/0233432 | A1* | 8/2015 | Biggs | .................... F16D 48/062 701/67 |
| 2016/0039421 | A1 | 2/2016 | Kaneta et al. | |
| 2018/0215258 | A1 | 8/2018 | Makita et al. | |

FOREIGN PATENT DOCUMENTS

| CN | 101395408 | 3/2009 |
| CN | 101398046 | 4/2009 |
| CN | 102213310 | 10/2011 |
| CN | 106143479 | 11/2016 |
| EP | 0984186 | 3/2000 |
| JP | 60-078119 | 5/1985 |
| JP | 05-202953 | 8/1993 |
| JP | 06-294462 | 10/1994 |
| JP | 2000-145934 | 5/2000 |
| JP | 2007-155104 | 6/2007 |
| JP | 2009-264519 | 11/2009 |
| JP | 2010-038181 | 2/2010 |
| JP | 2011-052790 | 3/2011 |
| JP | 2014-169779 | 9/2014 |
| JP | 2017-003114 | 1/2017 |
| JP | 2017-030691 | 2/2017 |
| WO | 2015/191308 | 12/2015 |

OTHER PUBLICATIONS

Extended European Search Report for European Patent Application No. 18824616.9 dated Feb. 28, 2020.
Chinese Office Action for Chinese Patent Application No. 201880043017.1 dated Jul. 27, 2020.
International Preliminary Report on Patentability for International Application Serial No. PCT/JP2018/008543 dated Jun. 18, 2019, 12 pages.
Indian Office Action for Indian Patent Application No. 202017000233 dated Jan. 6, 2021.

* cited by examiner

SECOND TARGET VALUE P2 MAP

| km/h \ GEAR | 1 | 2 | 3 | 4 | 5 | 6 |
|---|---|---|---|---|---|---|
| 5 | $A1_{pa}$ | $A2_{pa}$ | $A3_{pa}$ | $A4_{pa}$ | $A5_{pa}$ | $A6_{pa}$ |
| 10 | $B1_{pa}$ | $B2_{pa}$ | $B3_{pa}$ | $B4_{pa}$ | $B5_{pa}$ | $B6_{pa}$ |
| 15 | $C1_{pa}$ | $C2_{pa}$ | $C3_{pa}$ | $C4_{pa}$ | $C5_{pa}$ | $C6_{pa}$ |
| ⋮ | ⋮ | ⋮ | ⋮ | ⋮ | ⋮ | ⋮ |

FIG. 9

VEHICLE TRANSMISSION SYSTEM

TECHNICAL FIELD

The present invention relates to a vehicle transmission system.

The present application claims priority based on Japanese Patent Application No. 2017-129317 filed on Jun. 30, 2017, the contents of which are incorporated herein by reference.

BACKGROUND ART

A semi-automatic transmission system in which a clutch disposed on a path of transfer of a torque ranging from an engine to a wheel is operated by an actuator or a transmission disposed on its downstream side is also operated by an actuator in addition to the operation of the clutch is disclosed (for example, see Patent Document 1). In such a semi-automatic transmission system including the transmission and the clutch, when a driver gives an instruction for switching between gears by operating a shift button or a shift pedal, transfer of a torque to the transmission is interrupted by an actuator first disconnecting the clutch, and then a gear shift operation of the transmission is performed. Further, after a gear shift operation in the transmission, a connection operation of the clutch by an actuator, that is, control for transitioning the clutch from a disengaged state to an engaged state, is performed. When a vehicle is stopped, a gear of the transmission is automatically shifted to a low-speed side in accordance with a decrease in a vehicle speed, and the vehicle can be started from a low-speed gear or a so-called low gear (first speed) during restart after stop or the like.

RELATED ART DOCUMENT

Patent Document

Patent Document 1: Japanese Unexamined Patent Application, First Publication No. 2009-264519

SUMMARY

Problems to be Solved by the Invention

Incidentally, a semi-automatic transmission system of a type in which, in a transmission used for a motorcycle or the like, a gear shift operation of the transmission is performed by a driver, and only operations of disconnection and connection of a clutch of the transmission are automatically performed is also known. In the case of a transmission system in which only operations of disconnection and connection of a clutch are automatically performed in this manner, even when a vehicle decelerates, a gear of the transmission is never automatically shifted to a low-speed side as long as a driver does not perform a gear shift operation of the transmission. As a result, when a vehicle is stopped without a gear shift operation being performed, and restart is performed in a state in which a driver does not recognize that a gear position is located at, for example, a high gear of a second or higher speed, expected acceleration is impossible, and a large load may be applied to a clutch.

The present invention was contrived in view of such circumstances, and an object thereof is to provide a vehicle transmission system that makes it possible to allow a driver to recognize start at a high gear while a large load is prevented from being applied to a clutch even in a case where start is performed with a transmission located at a high gear.

Means for Solving the Problem

As means for solving the above problem, aspects of the present invention have the following configurations.

(1) A saddle-riding type vehicle transmission system according to an aspect of the present invention including: a transmission in which a gear is shifted by an operation of a driver of a saddle-riding type vehicle; a clutch device that is disposed in a motion transfer path between the transmission and an engine of the saddle-riding type vehicle, and is disconnected and connected by an action of a clutch actuator; a clutch control unit that is configured to control disconnection and connection of the clutch device by the clutch actuator; and an engine speed control unit that performs control so that a speed of the engine is set to be less than or no higher than an upper limit speed determined in advance, wherein in a case where the saddle-riding type vehicle is started with a gear position of the transmission located at or above a gear that is set in advance, and a vehicle speed is less than or no higher than a set value that is set in advance, the clutch control unit transitions to clutch capacity-limiting control in which a clutch capacity is reduced below that during normal clutch control.

(8) In the saddle-riding type vehicle transmission system according to the above (1), the clutch actuator may include a master cylinder that is configured to generate a hydraulic pressure, the clutch device may be disconnected and connected by an action of a slave cylinder to which a hydraulic pressure is supplied from the master cylinder, and the clutch control unit may be configured to set a target value of a hydraulic pressure to be supplied from the master cylinder to the slave cylinder, in the clutch capacity-limiting control, to a second target value lower than a first target value in a case where the gear position of the transmission is located at a first speed.

(9) In the saddle-riding type vehicle transmission system according to the above (8), the second target value may be set so that the saddle-riding type vehicle is able to travel using a driving force of the engine through the clutch device.

(10) In the saddle-riding type vehicle transmission system according to the above (8), the second target value may be set independently for each gear position of the transmission.

(11) The saddle-riding type vehicle transmission system according to the above (8) may further include the engine speed control unit that performs control so that a speed of the engine is set to be less than or no higher than the upper limit speed determined in advance in a case where the clutch control unit is configured to set the target value of the hydraulic pressure to the second target value.

(12) In the saddle-riding type vehicle transmission system according to the above (8), the clutch control unit may return a target value of a hydraulic pressure to be supplied to the slave cylinder from the second target value to the first target value when the vehicle speed is equal to or greater than the set value that is set in advance.

(13) The saddle-riding type vehicle transmission system according to the above (1) may further include an information output unit that is configured to output information indicating that the vehicle speed is low with respect to the gear position to an outside until the saddle-riding type vehicle is restarted and the vehicle speed exceeds the set value after the clutch device is opened due to a decrease in the vehicle speed with the gear position of the transmission located at or above the gear that is set in advance.

Advantage of the Invention

According to the vehicle transmission system described in above-described (1) of the present invention, in a case where the gear position of the transmission is located at or above a gear that is set in advance and the vehicle speed is lower than a set value that is set in advance, that is, in a case where start is attempted from a stopped state or a low-speed state in a state in which a gear is located at or above a high gear, transition to clutch capacity-limiting control in which a clutch capacity is reduced below that during normal clutch control is performed. Thereby, the clutch device starts to be engaged, but a clutch capacity is lower than a half-clutch state during normal start, and the amount of transfer of a dynamic force from an engine side is reduced. In this manner, in a state in which a clutch capacity is lower than a half-clutch state during normal start, traveling is possible while a large load is prevented from being applied to the clutch device, whereas an acceleration feeling expected by a driver is not obtained. Therefore, even in a case where start is performed with the transmission located at a high gear, it is possible to allow a driver to recognize start at a high gear while a large load is prevented from being applied to the clutch device.

According to the vehicle transmission system described in above-described (2) of the present invention, in a case where the gear position of the transmission is located at or above a gear that is set in advance and the vehicle speed is lower than a set value that is set in advance, that is, in a case where start is attempted from a stopped state or a low-speed state in a state in which a gear is located at or above a high gear, the target value of the hydraulic pressure to be supplied to the slave cylinder is set to the second target value lower than the first target value during normal start in which a gear position is located at a first speed. Thereby, the clutch device starts to be engaged, but a clutch capacity is lower than a half-clutch state during normal start, and the amount of transfer of a dynamic force from an engine side is reduced. In this manner, in a state in which a clutch capacity is lower than a half-clutch state during normal start, traveling is possible while a large load is prevented from being applied to the clutch device, whereas an acceleration feeling expected by a driver is not obtained. Therefore, even in a case where start is performed with the transmission located at a high gear, it is possible to allow a driver to recognize start at a high gear while a large load is prevented from being applied to the clutch device.

According to the vehicle transmission system described in above-described (3) of the present invention, the second target value is set so that a vehicle having the vehicle transmission system mounted therein can travel, whereby it is possible to cause the vehicle to continue to travel while a large load is prevented from being applied to the clutch device even in a case where the transmission is at a high gear relative to a vehicle speed.

According to the vehicle transmission system described in above-described (4) of the present invention, the second target value is set for each gear position, whereby it is possible to cause a vehicle to continue to travel while avoiding an overload applied to the clutch device regardless of a gear position.

According to the vehicle transmission system described in above-described (5) of the present invention, in a case where the target value of the hydraulic pressure to be supplied to the slave cylinder is set to the second target value, the engine is controlled to be less than or no higher than the upper limit speed, whereby it is possible to suppress an overspeed of the engine in a state in which a clutch capacity is lower than a half-clutch state during normal start.

According to the vehicle transmission system described in above-described (6) of the present invention, in a case where a vehicle speed exceeds the set value after the target value of the hydraulic pressure to be supplied to the slave cylinder is set to the second target value, the target value of the hydraulic pressure to be supplied is returned to the first target value, whereby it is possible to perform the same acceleration as that during normal start.

According to the vehicle transmission system described in above-described (7) of the present invention, in a case where a gear position is located at or above a high gear and a vehicle speed is less than or no higher than a set value that is set in advance, information indicating that a vehicle speed is low with respect to a gear position is output from the information output unit, whereby it is possible for a driver to recognize more reliably that low-speed travel at a high gear is performed.

DESCRIPTION OF THE EMBODIMENTS

Hereinafter, an embodiment of the present invention will be described with reference to the drawings. In addition, in the following description, directions such as forward, rearward, left, right, and the like are the same as those in a vehicle to be described below unless otherwise mentioned. Furthermore, an arrow FR representing a vehicle front side, an arrow LH representing a vehicle left side, and an arrow UP representing a vehicle upper side are illustrated at appropriate places in drawings used in the following description.

Figure 1:
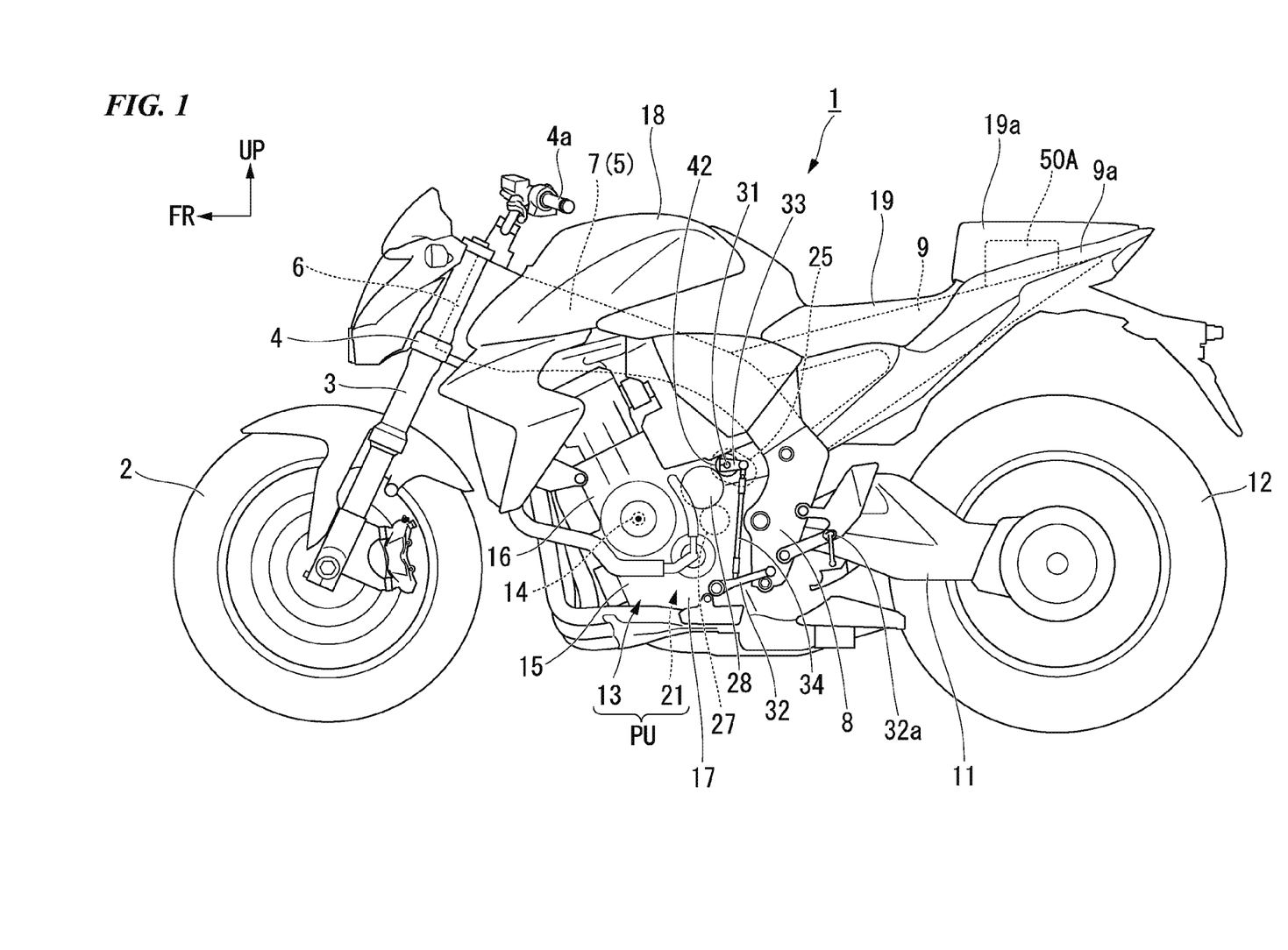
FIG. 1 is a left side view of a motorcycle in an embodiment of the present invention.

As illustrated in FIG. 1, this embodiment is applied to a motorcycle 1 that is a saddle riding-type vehicle (vehicle). A front wheel 2 of the motorcycle 1 is supported by lower ends of one pair of left and right front forks 3. Upper parts of the left and right front forks 3 are supported by a head pipe 6 of a front end of a vehicle body frame 5 through a steering stem 4. A bar-type steering handle 4a is mounted on a top bridge of the steering stem 4.

The vehicle body frame 5 includes a head pipe 6, a main tube 7 that extends from the head pipe 6 toward a rear lower side at the center in a vehicle width direction (leftward/rightward direction), left and right pivot frames 8 connected to a lower side of a rear end of the main tube 7, and a seat frame 9 connected to the rear side of the main tube 7 and the left and right pivot frames 8. In the left and right pivot frames 8, a front end of a swing arm 11 is pivoted to be swingable. At a rear end of the swing arm 11, a rear wheel 12 of the motorcycle 1 is supported.

On an upper side of the left and right main tubes 7, a fuel tank 18 is supported. On a side behind the fuel tank 18, a front seat 19 and a rear seat cover 19*a* are aligned in front of and behind each other and supported on the seat frame 9. The periphery of the seat frame 9 is covered with a rear cowl 9*a*. Below the left and right main tubes 7, a power unit PU that is a motor of the motorcycle 1 is suspended. The power unit PU is linked with the rear wheel 12, for example, through a chain-type transmission mechanism.

The power unit PU integrally includes an engine 13 positioned on the front side thereof and a transmission 21 positioned on the rear side. The engine 13, for example, is a multiple cylinder engine in which a rotary shaft of a crank shaft 14 is aligned along the leftward/rightward direction (vehicle width direction). The engine 13 raises a cylinder 16 above a front part of a crank case 15. A rear part of the crank case 15 is formed as a transmission case 17 that houses the transmission 21.

Figure 2:
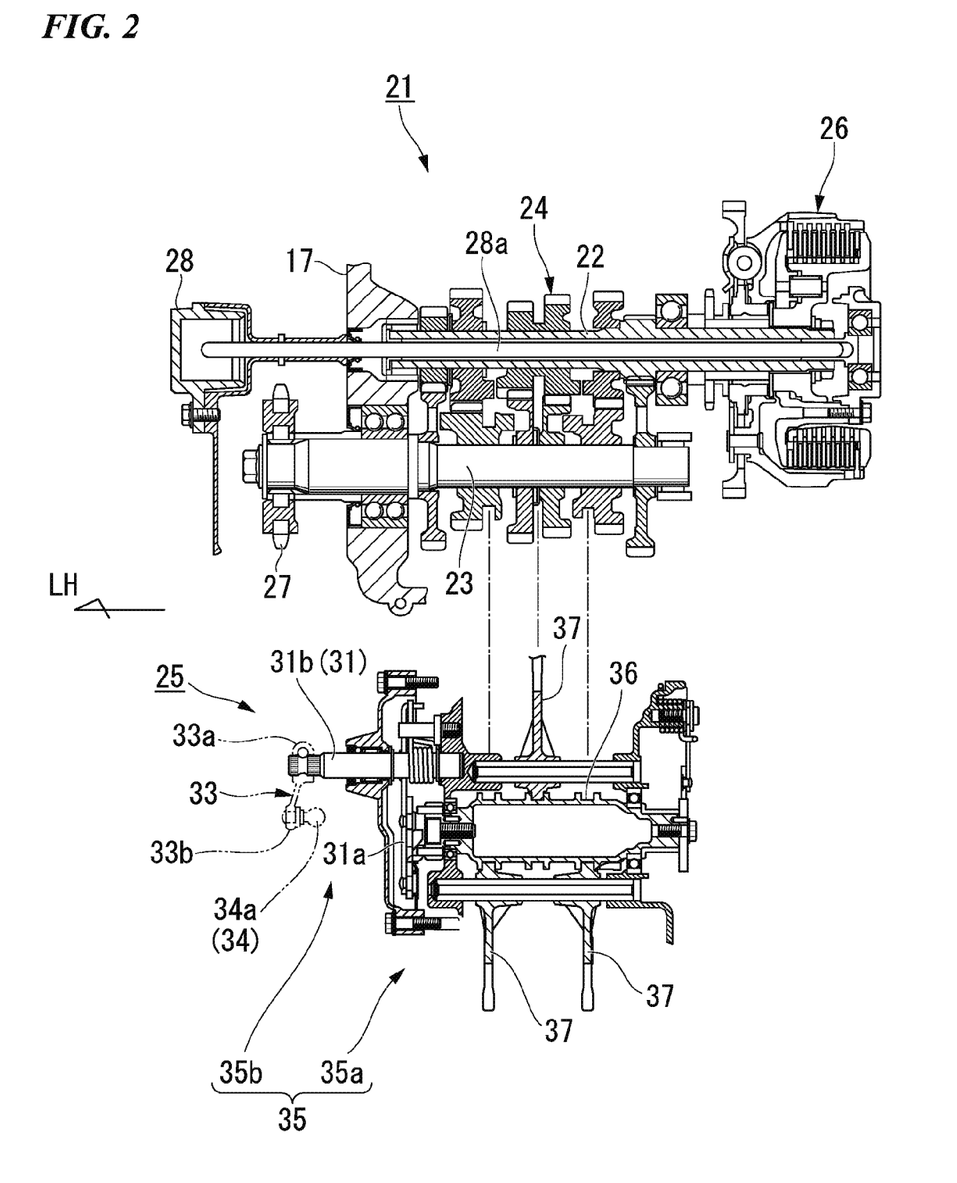
FIG. 2 is a cross-sectional view of a transmission and a change mechanism of the motorcycle.

As illustrated in FIG. 2, the transmission 21 is a stepped transmission including a main shaft 22, a counter shaft 23, and a transmission gear group 24 disposed across both the shafts 22 and 23. The counter shaft 23 configures an output shaft of not only the transmission 21 but also the power unit PU. An end of the counter shaft 23 protrudes to the left side of a rear part of the crank case 15 and is connected to the rear wheel 12 through the chain-type transmission mechanism.

The transmission gear group 24 includes gears corresponding to the number of transmission steps supported at both the shafts 22 and 23. The transmission 21 is a constant mesh type in which a pair of corresponding gears of the transmission gear group 24 are constantly engaged with each other between the both shafts 22 and 23. A plurality of gears supported at both the shafts 22 and 23 can be classified into a free gear that can rotate with respect to a corresponding shaft and a slide gear (shifter) that is spline-fitted to a corresponding shaft. On one side of the free gear and the slide gear, a convex dog is disposed in the axial direction, and, on the other side, a concave slot is disposed in the axial direction so as to be engaged with the dog. In other words, the transmission 21 is a so-called dog mission.

Figure 3:
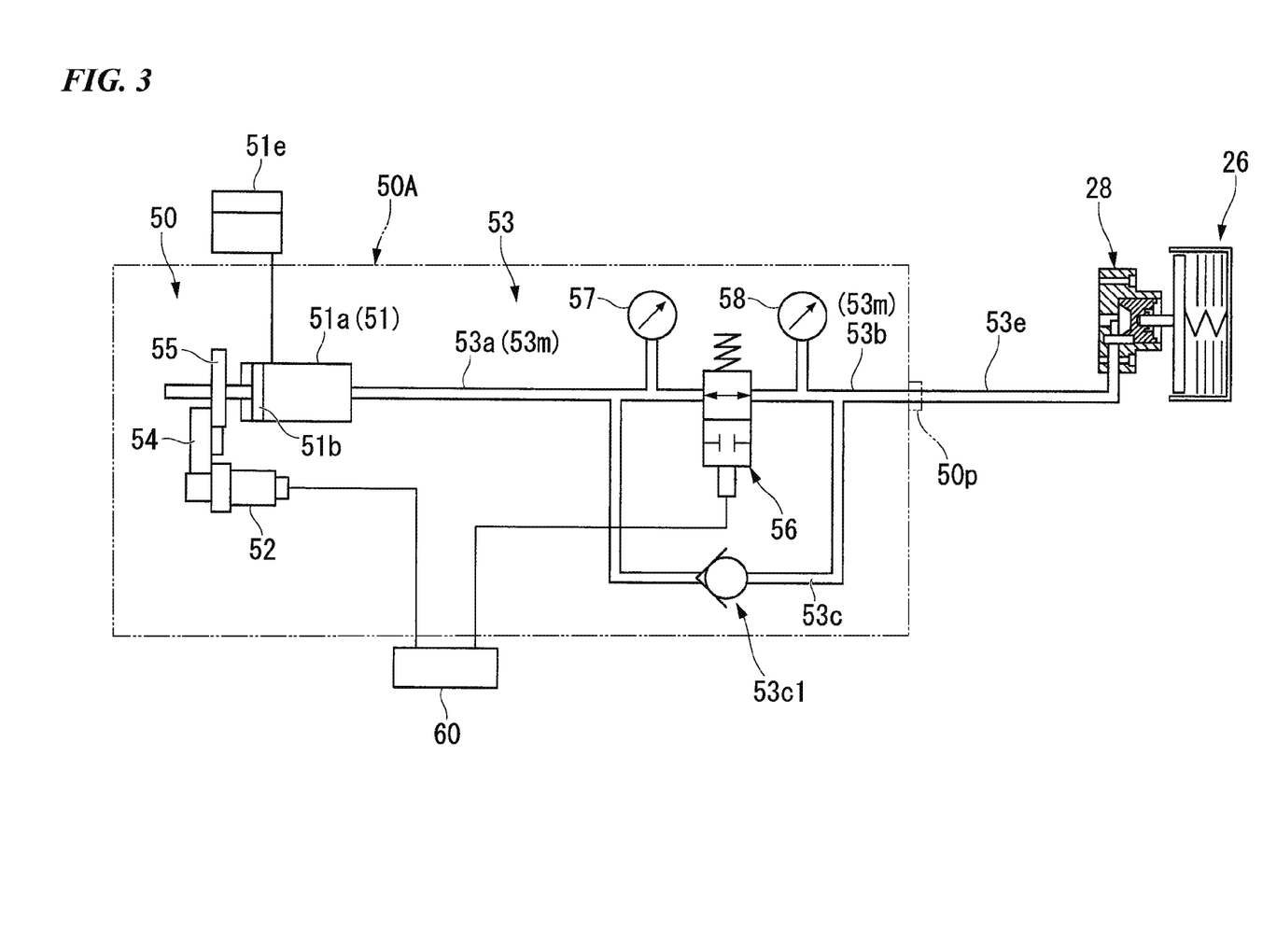
FIG. 3 is a diagram schematically showing a clutch operation system including a clutch actuator.

Also referring to FIG. 3, the main shaft 22 and the counter shaft 23 of the transmission 21 are arranged to be aligned in front of and behind each other on the side behind the crank shaft 14. At a right end of the main shaft 22, a clutch device 26 operated by a clutch actuator 50 is coaxially disposed. The clutch device 26, for example, is a wet multiplate clutch and a so-called normal open clutch. In other words, the clutch device 26 reaches a connection state in which power can be transmitted in accordance with the supply of a hydraulic pressure from the clutch actuator 50 and is returned to a cut-off state in which power cannot be transmitted when the supply of the hydraulic pressure from the clutch actuator 50 disappears.

Referring to FIG. 2, the rotation power of the crank shaft 14 is transmitted to the main shaft 22 through the clutch device 26 and is transmitted from the main shaft 22 to the counter shaft 23 through an arbitrary gear pair of the transmission gear group 24. At a left end of the counter shaft 23 that protrudes to the left side of a rear part of the crank case 15, a drive sprocket 27 of the chain-type transmission mechanism is mounted.

Above the rear of the transmission 21, a change mechanism 25 that performs switching between gear pairs of the transmission gear group 24 is housed. The change mechanism 25 operates a plurality of shift forks 37 in accordance with the pattern of a lead groove formed on the outer periphery thereof in accordance with rotation of a shift drum 36 having a hollow cylindrical shape parallel to both the shafts 22 and 23 and performs switching of a gear pair used for power transmission between both the shafts 22 and 23 in the transmission gear group 24.

The change mechanism 25 includes a shift spindle 31 parallel to the shift drum 36. At the time of rotation of the shift spindle 31, a shift arm 31*a* fixed to the shift spindle 31 rotates the shift drum 36, moves the shift fork 37 in the axial direction in accordance with the pattern of the lead groove and switches a gear pair that can transmit power in the transmission gear group 24 (in other words, a transmission step is changed).

The shift spindle 31 causes a shaft outer part 31*b* to protrude to an outward side (left side) of the crank case 15 in the vehicle width direction such that the change mechanism 25 can be operated. A shift load sensor 42 is coaxially mounted in the shaft outer part 31*b* of the shift spindle 31 (see FIG. 1). A swing lever 33 is mounted in the shaft outer part 31*b* of the shift spindle 31 (or a rotation shaft of the shift load sensor 42). The swing lever 33 extends from a base end part 33*a* that is fixed to the shift spindle 31 (or the rotation shaft) through clamp fixing to the rear side, and an upper end of a link rod 34 is connected to a tip end part 33*b* thereof through an upper ball joint 34*a* to be freely swingable. A lower end of the link rod 34 is connected to a shift pedal 32 that is operated by a driver using a foot through a lower ball joint (not illustrated in the drawing) to be swingable.

As illustrated in FIG. 1, the shift pedal 32 has a front end supported at a lower part of the crank case 15 to be vertically swingable through a shaft along a leftward/rightward direction. A pedal part on which a driver's toes in a step 32*a* are placed is disposed in a rear end of the shift pedal 32, and a lower end of the link rod 34 is connected to a middle part before and after the shift pedal 32.

As illustrated in FIG. 2, a shift change device 35 that includes the shift pedal 32, the link rod 34, and the change mechanism 25 and performs switching of a transmission step gear of the transmission 21 is configured. In the shift change device 35, an assembly (the shift drum 36, the shift forks 37, and the like) that switches a transmission step of the transmission 21 inside the transmission case 17 will be referred to as a transmission operating unit 35*a*, and an assembly (the shift spindle 31, the shift arm 31*a*, and the like) to which a transmission operation for the shift pedal 32 is input and rotates around the shift spindle 31 and transmits this rotation to the transmission operating unit 35*a* will be referred to as a transmission operation receiving unit 35*b*.

Here, the motorcycle 1 employs a so-called semi-automatic transmission system (vehicle transmission system) in which only a transmission operation of the transmission 21 (a foot operation of the shift pedal 32) is performed by a driver, and a coupling/decoupling operation of the clutch device 26 is automatically performed through electrical control in accordance with an operation on the shift pedal 32.

Figure 4:
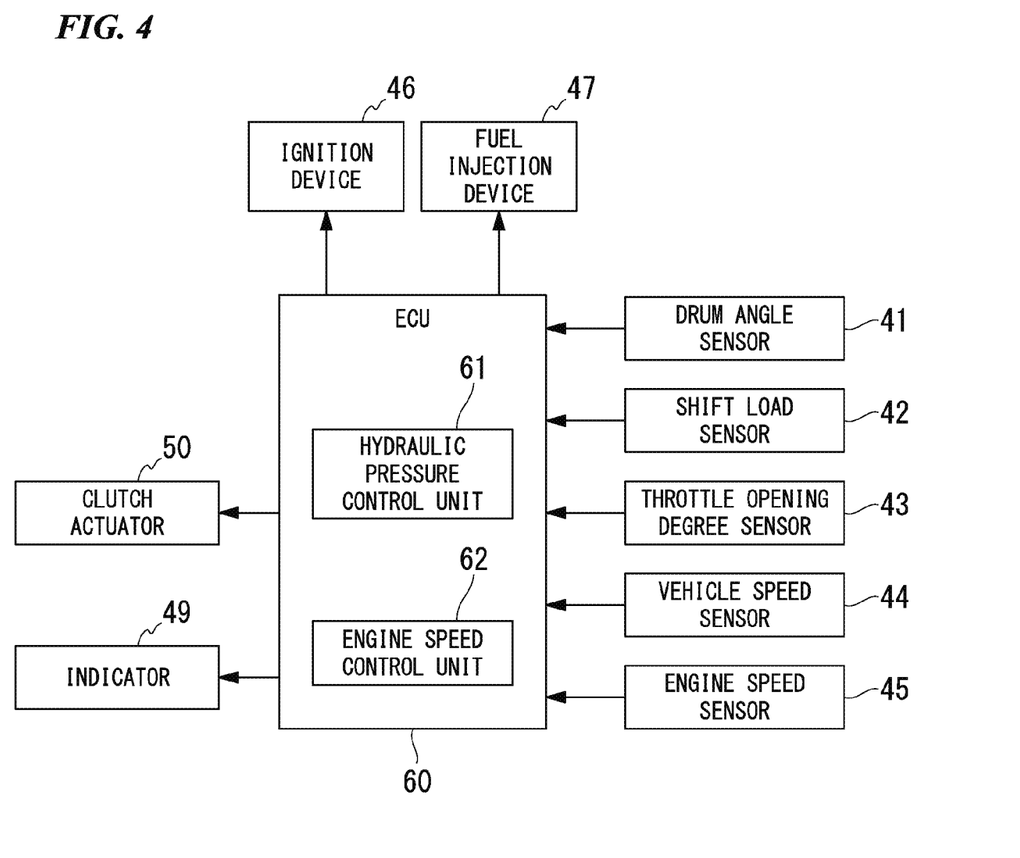
FIG. 4 is a block diagram of a transmission system.

As illustrated in FIG. 4, the transmission system described above includes a clutch actuator 50, an electronic control unit (ECU; control device) 60, and various sensors 41 to 45.

The ECU 60 controls the operation of an ignition device 46 and a fuel injection device 47 together with controlling the operation of the clutch actuator 50 on the basis of detection information from a drum angle sensor (gear position sensor) 41 detecting a transmission step number from a rotation angle of the shift drum 36 and the shift load sensor (torque sensor) 42 detecting an operation torque input to the shift spindle 31 and various types of vehicle state detection information from a throttle opening degree sensor 43, a vehicle speed sensor 44, and an engine speed sensor 45, and the like. Detection information from hydraulic pressure sensors 57 and 58 to be described later is also input to the ECU 60.

In addition, the ECU 60 includes a hydraulic pressure control unit (clutch control unit) 61 and an engine speed control unit 62, and functions thereof will be described later.

Referring also to FIG. 3, the clutch actuator 50 can control a liquid pressure used for coupling/decoupling the clutch device 26 by being controlled such that it operates by the ECU 60. The clutch actuator 50 includes an electric motor 52 (hereinafter, simply referred to as a motor 52) as a drive source and a master cylinder 51 driven by the motor 52. The clutch actuator 50 configures a clutch control unit 50A as one body together with the hydraulic pressure circuit device 53 disposed between the master cylinder 51 and a hydraulic pressure supply-discharge port 50p.

The ECU 60 calculates a target value of a hydraulic pressure (target hydraulic pressure) supplied to a slave cylinder 28 for coupling/decoupling the clutch device 26 on the basis of a calculation program set in advance and controls the clutch control unit 50A such that a hydraulic pressure (a current hydraulic pressure) of the slave cylinder 28 side that is detected by a downstream-side hydraulic pressure sensor 58 is close to the target hydraulic pressure.

The master cylinder 51 causes a piston 51b inside a cylinder main body 51a to perform a stroke in accordance with driving of the motor 52 and enables the supply/discharge of hydraulic oil inside the cylinder main body 51a for the slave cylinder 28. In addition, in the drawing, a reference numeral 55 represents a conversion mechanism as a ball screw mechanism, a reference numeral 54 represents a transmission mechanism disposed across the motor 52 and the conversion mechanism 55, and a reference numeral 51e represents a reservoir connected to the master cylinder 51.

The hydraulic pressure circuit device 53 includes a valve mechanism (a solenoid valve 56) opening or blocking a middle portion of a main oil path (a hydraulic pressure supply/discharge oil path) 53m extending from the master cylinder 51 to the clutch device 26 side (the slave cylinder 28 side). The main oil path 53m of the hydraulic pressure circuit device 53 can be divided into an upstream-side oil path 53a that is on the master cylinder 51 side from the solenoid valve 56 and a downstream-side oil path 53b that is on the slave cylinder 28 side from the solenoid valve 56. In addition, the hydraulic pressure circuit device 53 includes a bypass oil path 53c that bypasses the solenoid valve 56 and causes the upstream-side oil path 53a and the downstream-side oil path 53b to communicate with each other.

The solenoid valve 56 is a so-called normal open valve. A one-way valve 53c1 causing a hydraulic oil to flow in only one way from the upstream side to the downstream side is disposed in the bypass oil path 53c. On the upstream side of the solenoid valve 56, an upstream-side hydraulic pressure sensor 57 detecting a hydraulic pressure of the upstream-side oil path 53a is disposed. On the downstream side of the solenoid valve 56, a downstream-side hydraulic pressure sensor 58 detecting a hydraulic pressure of the downstream-side oil path 53b is disposed.

As illustrated in FIG. 1, the clutch control unit 50A, for example, is housed in the rear cowl 9a. The slave cylinder 28 is mounted on the left side of the rear part of the crank case 15. The clutch control unit 50A and the slave cylinder 28 are connected through a hydraulic piping 53e (see FIG. 3).

As illustrated in FIG. 2, the slave cylinder 28 is coaxially disposed on the left side of the main shaft 22. When a hydraulic pressure is supplied from the clutch actuator 50, the slave cylinder 28 presses a push rod 28a passing through the inside of the main shaft 22 to the right side. By pressing the push rod 28a to the right side, the slave cylinder 28 operates the clutch device 26 to be in a connected state through the push rod 28a. When the supply of the hydraulic pressure disappears, the slave cylinder 28 releases the pressing of the push rod 28a and returns the clutch device 26 to a disconnected state.

In order to maintain the clutch device 26 to be in the connected state, it is necessary to continue the supply of the hydraulic pressure, and power is consumed as that much. Thus, as illustrated in FIG. 3, the solenoid valve 56 is disposed in the hydraulic pressure circuit device 53 of the clutch control unit 50A, and the solenoid valve 56 is closed after the supply of the hydraulic pressure to the clutch device 26 side. In this way, the hydraulic pressure supplied to the clutch device 26 side is maintained, and a hydraulic pressure corresponding to a decrease in the pressure is configured to be supplemented (recharged by an amount corresponding to a leak), whereby the energy consumption is inhibited.

Next, an action of a clutch control system will be described with reference to a graph illustrated in FIG. 5. In the graph illustrated in FIG. 5, the vertical axis represents a supplied hydraulic pressure detected by the downstream-side hydraulic pressure sensor 58, and the horizontal axis represents an elapsed time.

At the time of stopping (idling) of the motorcycle 1, both the motor 52 and the solenoid valve 56 controlled by the ECU 60 are in a state in which the supply of power is blocked. In other words, in a stop state of the motor 52, the solenoid valve 56 is in an open-valve state. At this time, the slave cylinder 28 side (the downstream side) is in a low-pressure state having a pressure lower than a touch point hydraulic pressure TP, and the clutch device 26 is in a non-fastened state (a disconnected state, a released state). This state corresponds to an area A illustrated in FIG. 5.

At the time of starting the motorcycle 1, when the speed of the engine 13 is increased, power is supplied only to the motor 52, and a hydraulic pressure is supplied from the master cylinder 51 to the slave cylinder 28 through the solenoid valve 56 that is in the open-valve state. When the hydraulic pressure of the slave cylinder 28 side (the downstream side) rises to be equal to or higher than the touch point hydraulic pressure TP, the fastening of the clutch device 26 starts, and the clutch device 26 becomes in a half-clutch state in which a part of power can be transmitted. In this way, smooth start of the motorcycle 1 can be performed. This state corresponds to an area B illustrated in FIG. 5.

Thereafter, when a difference between input rotation and output rotation of the clutch device 26 decreases, and the hydraulic pressure of the slave cylinder 28 side (the downstream side) reaches a lower limit holding hydraulic pressure LP, the fastening of the clutch device 26 transitions to a locked state, and all the driving force of the engine 13 is transmitted to the transmission 21. This state corresponds to an area C illustrated in FIG. 5. The areas A to C form a starting area.

In order to supply a hydraulic pressure from the master cylinder 51 side to the slave cylinder 28 side, the solenoid valve 56 is caused to be in the open-valve state, the motor 52 is driven to rotate in normal direction through conduction, and the master cylinder 51 is pressed. In this way, the hydraulic pressure of the slave cylinder 28 side is adjusted to a clutch fastening hydraulic pressure. At this time, the driving of the clutch actuator 50 is controlled through feedback based on a detected hydraulic pressure acquired by the downstream-side hydraulic pressure sensor 58.

Then, when the hydraulic pressure of the slave cylinder 28 side (the downstream side) reaches an upper limit holding hydraulic pressure HP, power is supplied to the solenoid valve 56, and the solenoid valve 56 operates to be closed, and the supply of power to the motor 52 is stopped, and the generation of the hydraulic pressure is stopped. In other words, the upstream side becomes in a low pressure state in accordance with release of the hydraulic pressure, and the downstream side is maintained to be in the high pressure state (the upper limit holding hydraulic pressure HP). In this way, the clutch device 26 is maintained to be in the fastened state without the master cylinder 51 generating a hydraulic pressure, and the power consumption can be inhibited while running of the motorcycle 1 is enabled.

Here, depending on a transmission operation, there may be also cases in which transmission is performed immediately after a hydraulic pressure is filled in the clutch device 26. In such a case, before the solenoid valve 56 operates to be closed to cause the upstream side to be in a low pressure state, the motor 52 is reversely driven in an open-valve state of the solenoid valve 56, the master cylinder 51 is decompressed and is caused to communicate with the reservoir 51e, and the hydraulic pressure of the clutch device 26 side is relieved on the master cylinder 51 side. At this time, the driving of the clutch actuator 50 is controlled through feedback on the basis of a detected hydraulic pressure acquired by the upstream-side hydraulic pressure sensor 57.

Figure 5:
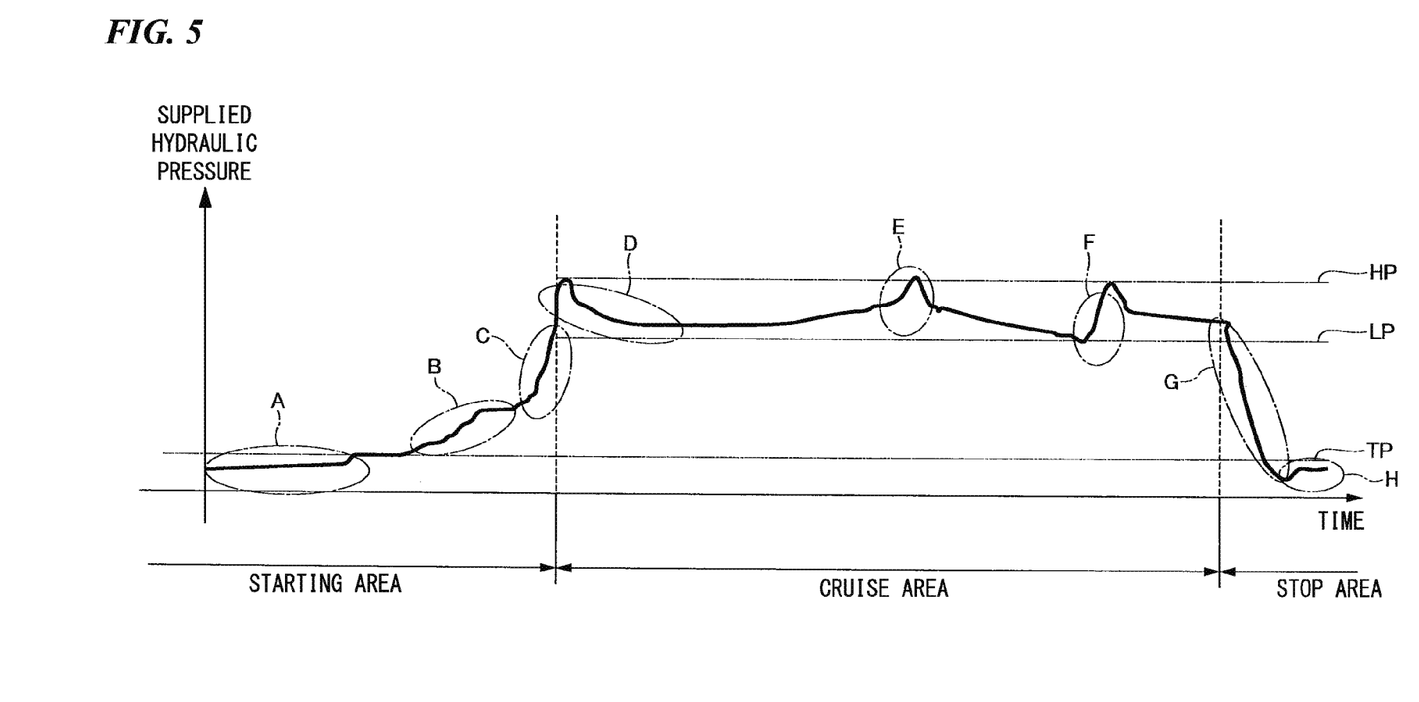
FIG. 5 is a graph showing a change in a hydraulic pressure to be supplied in the clutch actuator.

Even in a state in which the solenoid valve 56 is closed, and the clutch device 26 is maintained to be in the fastened state, as in an area D illustrated in FIG. 5, the hydraulic pressure of the downstream side gradually decreases (leaks). In other words, the hydraulic pressure of the downstream side gradually decreases in accordance with factors such as a leakage of the hydraulic pressure and a temperature decrease according to deformation of seals of the solenoid valve 56 and the one-way valve 53c1.

Meanwhile, as in an area E illustrated in FIG. 5, there are also cases in which a hydraulic pressure of the downstream side rises in accordance with a rise in the temperature and the like. A fine hydraulic pressure variation of the downstream side can be absorbed by an accumulator not illustrated in the drawing, and there is no increase in power consumption according to the operating of the motor 52 and the solenoid valve 56 every time the hydraulic pressure changes.

As in an area E illustrated in FIG. 5, in a case in which a hydraulic pressure of the downstream side rises up to the upper limit holding hydraulic pressure HP, by decreasing the supply of power to the solenoid valve 56 or the like, the solenoid valve 56 is caused to be in an open-valve state in a stepped manner, and the hydraulic pressure of the downstream side is relieved toward the upstream side.

As illustrated in an area F illustrated in FIG. 5, in a case in which the hydraulic pressure of the downstream side decreases to the lower limit holding hydraulic pressure LP, the solenoid valve 56 starts to supply power to the motor 52 with the valve closed and raises the hydraulic pressure of the upstream side. When the hydraulic pressure of the upstream side is above the hydraulic pressure of the downstream side, this hydraulic pressure is supplied (recharged) to the downstream side through the bypass oil path 53c and the one-way valve 53c1. When the hydraulic pressure of the downstream side becomes the upper limit holding hydraulic pressure HP, the supply of power to the motor 52 is stopped, and the generation of the hydraulic pressure stops. In this way, the hydraulic pressure of the downstream side is maintained between the upper limit holding hydraulic pressure HP and the lower limit holding hydraulic pressure LP, and the clutch device 26 is maintained to be in the fastened state. The areas D to F are set to a cruise area.

During stop of the motorcycle 1, the supply of power to both the motor 52 and the solenoid valve 56 is stopped together. In this way, the master cylinder 51 stops the generation of a hydraulic pressure and stops the supply of a hydraulic pressure to the slave cylinder 28. The solenoid valve 56 becomes an open-valve state, and the hydraulic pressure of the inside of the downstream-side oil path 53b is returned to the reservoir 51e. As above, the slave cylinder 28 side (the downstream side) becomes a low pressure state having a hydraulic pressure lower than the touch point hydraulic pressure TP, and the clutch device 26 becomes a non-fastened state. This state corresponds to areas G and H illustrated in FIG. 5. The areas G and H will be set as a stop area.

Next, transmission control of the motorcycle 1 of the present invention will be described.

Figure 9:
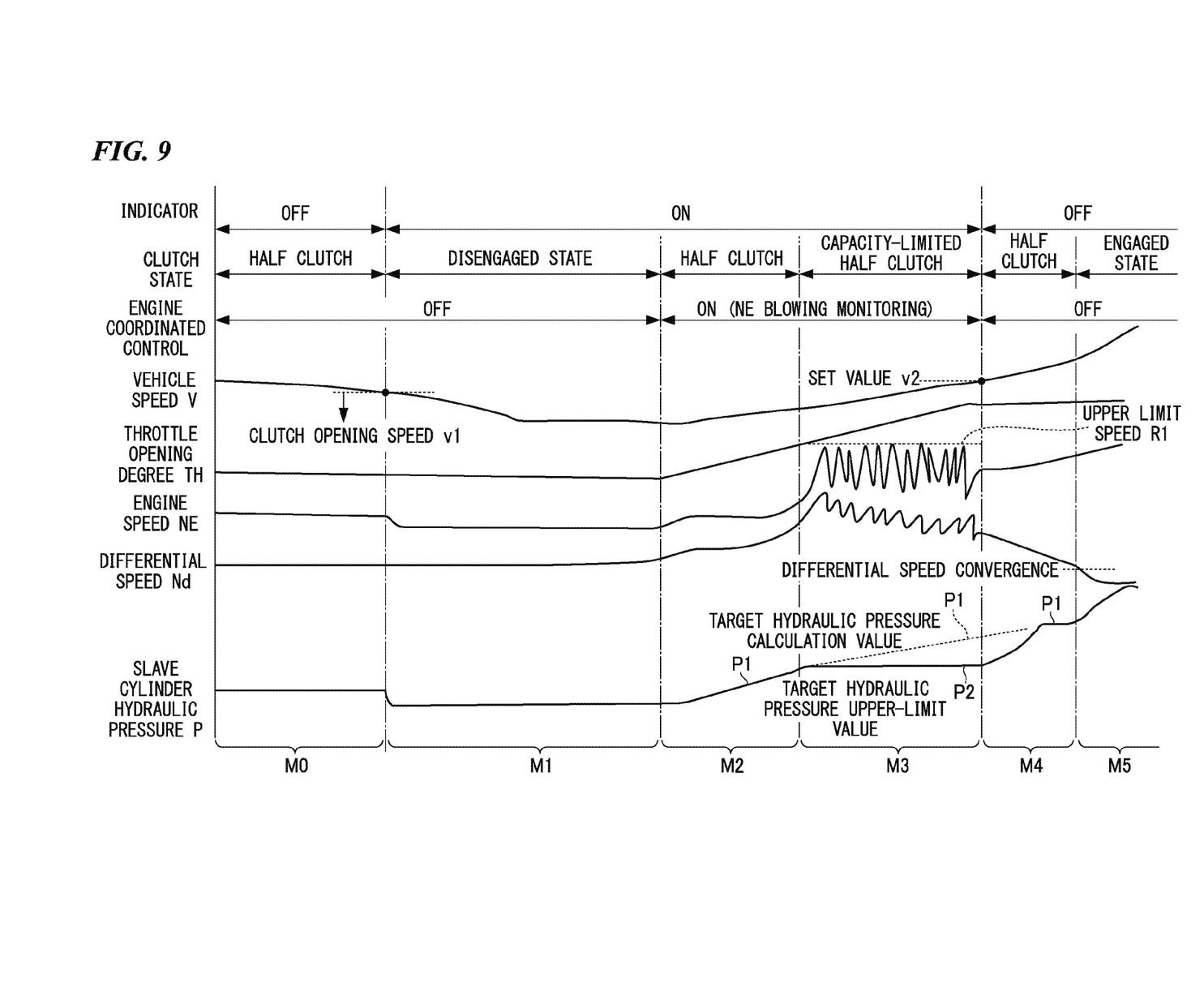
FIG. 9 is a timing diagram showing a change in a parameter of each portion relating to a high gear start state of the motorcycle.

Referring to FIG. 9, during restart after a stopped state or a low-speed state (a state in which a vehicle speed V falls below a clutch release vehicle speed v1) due to deceleration, the motorcycle 1 executes the following transmission control when the motorcycle is started while being at a high gear position of, for example, a second or higher speed due to a driver forgetting a shift operation or the like instead of originally starting the motorcycle at a gear position of a first speed.

That is, in a case where the motorcycle 1 is started with the gear position of the transmission 21 located at a second or higher speed, and a case where the vehicle speed V is less than a set value v2 that is set in advance, the hydraulic pressure control unit 61 (see FIG. 4) of the ECU 60 transitions to clutch capacity-limiting control in which a clutch capacity is reduced below that during normal clutch control (state M3).

Hereinafter, a state in which a throttle opening degree TH and an engine speed NE are greater than set values determined in advance with the gear position of the transmission 21 located at a second or higher speed is referred to as a "high gear start state".

In the above clutch capacity-limiting control, the hydraulic pressure control unit 61 sets a target value of a hydraulic pressure to be supplied from the master cylinder 51 of the clutch actuator 50 to the slave cylinder 28 to a second target value P2 lower than a first target value P1 in a case where the gear position of the transmission 21 is a first speed.

Thereby, although a hydraulic pressure generated in the master cylinder 51 is supplied to the slave cylinder 28 and the engagement of the clutch device 26 is started, a clutch capacity is set to be lower than a half-clutch state during normal start with the gear position located at a first speed, and the amount of transfer of a dynamic force from the engine 13 side is reduced. In a high gear start state, when a clutch capacity is set to be lower than in the half-clutch state during normal start, so-called slippage of the clutch device 26 becomes greater than in the half-clutch state. Thus, in a high gear start state, even when a differential speed Nd between the speed of the engine 13 and the engine speed NE converted from the speed of the counter shaft 23 becomes higher, a large load is prevented from being applied to the clutch device 26.

When the vehicle speed V is set to be equal to or greater than the set value v2, the hydraulic pressure control unit 61 returns a target value of a hydraulic pressure to be supplied to the slave cylinder 28 from the second target value P2 to the first target value P1 (state M4). Thereby, it is possible to perform the same acceleration as that during normal start rapidly after the clutch capacity-limiting control.

The second target value P2 is set so that the motorcycle 1 can travel using a driving force of the engine 13 through the clutch device 26. Based on this setting, the motorcycle 1 can continue to travel while a large load is prevented from being applied to the clutch device 26 and suppressing an overspeed of the engine 13.

The second target value P2 has a set value for which a load of a predetermined value or more is not applied to the clutch device 26. Since the load of the clutch device 26 increases as a transmission gear ratio becomes greater, a load of a highest gear, for example, during a sixth speed becomes greatest. When the load of the clutch device 26 is set to a predetermined value or less in this case, a margin occurs in a gear lower than this value with respect to a load. Thus, when the second target value P2 is set to a value for which the load of the clutch device 26 is set to a predetermined value or less in a highest gear, the load of the clutch device 26 is set to a predetermined value or less in all the gear positions.

Figure 8:
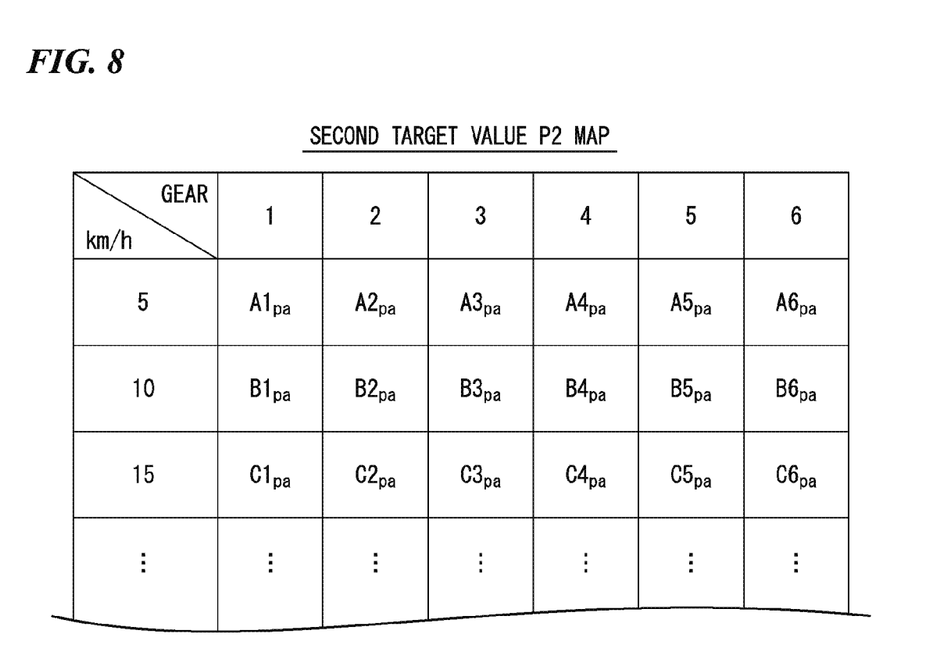
FIG. 8 is a map showing an example of a target value of a hydraulic pressure to be supplied to the slave cylinder which is set in accordance with a vehicle speed for each gear position.

In addition, as shown in FIG. 8, the second target value P2 may be set independently for each gear position of the transmission 21. In the map of FIG. 8, the horizontal axis represents a gear position, and the vertical axis represents a vehicle speed. The map of FIG. 8 is stored in the hydraulic pressure control unit 61 in advance, and the second target value P2 is selected in accordance with a gear position and a vehicle speed in the above clutch capacity-limiting control.

Referring to FIG. 9, the engine speed control unit 62 of the ECU 60 controls operations of the ignition device 46 and the fuel injection device 47 so that an overspeed of the engine 13 does not occur due to the slippage of the clutch device 26 through the clutch capacity-limiting control during a high gear start state. Specifically, the engine speed control unit 62 controls the engine 13 so that the engine speed NE does not exceed an upper limit speed R1 determined in advance (state M3). Thereby, the engine speed NE is prevented from excessively increasing during a high gear start state.

Referring to FIG. 4, the motorcycle 1 includes an indicator (information output unit) 49 in, for example, a meter device or the like in the vicinity of the steering handle 4a. The indicator 49 is, for example, a lamp, and lights up or blinks in a situation in which a vehicle speed is low with respect to a gear position. The indicator 49 outputs information indicating that a vehicle speed is low with respect to a gear position to a driver. The indicator 49 starts to light up or blink at a point in time when the motorcycle 1 decelerates with the gear position of the transmission 21 located at a second or higher speed and the vehicle speed V falls below the clutch release vehicle speed v1.

The indicator 49 continues to light up or blink until the motorcycle 1 is restarted and the vehicle speed V exceeds the set value after the clutch device 26 is opened. Light emission, prescribed display or the like as the information indicating that a vehicle speed is low with respect to a gear position is output to the outside through lighting-up or blink of the indicator 49. Meanwhile, an information output unit for the sense of hearing like a speaker or the like, and an information output unit for the sense of touch like a vibrator or the like may be included in addition to an information output unit for the sense of sight like the indicator 49.

Next, an example of processing performed in the ECU 60 during transmission control in the aforementioned high gear start state will be described with reference to flow charts of FIGS. 6 and 7. The control flows shown in FIGS. 6 and 7 are repeatedly executed in a prescribed control period (1 to 10 msec) in the case of start (acceleration) from a stopped state or a low-speed state in which the vehicle speed V falls below the clutch release vehicle speed v1.

Figure 6:
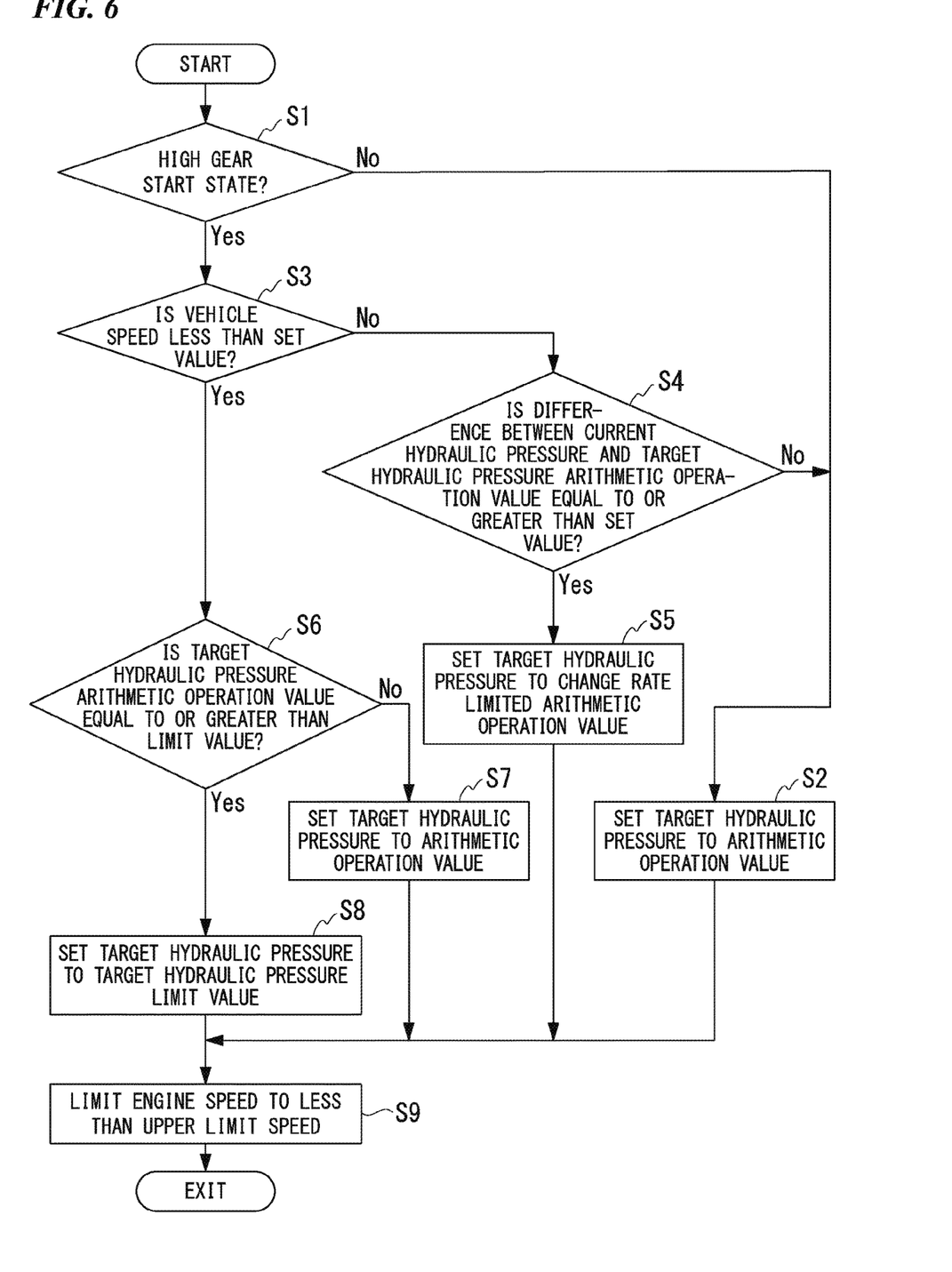
FIG. 6 is a flow chart showing a control flow of supply of a hydraulic pressure to a slave cylinder during start of the motorcycle.
Figure 7:
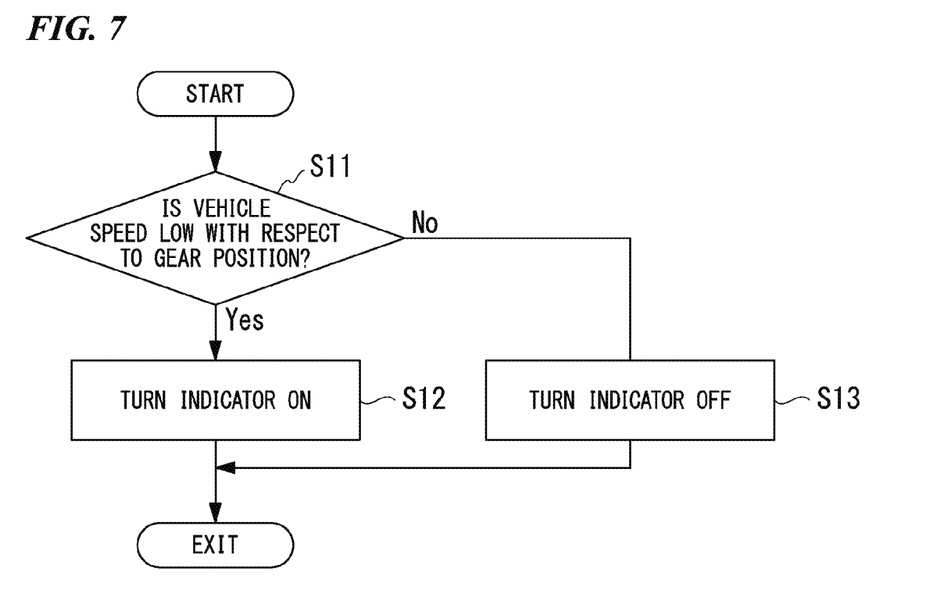
FIG. 7 is a flow chart showing a control flow of an indicator during start of the motorcycle.

First, as shown in FIG. 6, the ECU 60 determines whether or not the vehicle is in a high gear start state (step S1). Specifically, first, as a condition of a high gear start state, the ECU determines whether or not being a state in which the gear position of the transmission 21 detected by the drum angle sensor 41 is located at a second or higher speed, the throttle opening degree TH detected by the throttle opening degree sensor 43 is equal to or greater than a set value determined in advance, and the speed of the engine 13 detected by the engine speed sensor 45 is equal to or greater than a set value determined in advance.

As a result, in a case where it is determined not to be a high gear start state (No in step S1), that is, in a case where at least one of the throttle opening degree TH and the engine speed NE during start at a first speed is small, the process transitions to step S2. In step S2, the hydraulic pressure control unit 61 sets a target value (target hydraulic pressure) of a hydraulic pressure to be supplied from the master cylinder 51 to the slave cylinder 28 to an arithmetic operation value (target hydraulic pressure calculation value) calculated on the basis of an arithmetic operation program that is set in advance. Step S2 corresponds to the latter half of state M4 to state M5 in FIG. 9. In step S2, the clutch device 26 is set to be in a half-clutch state, and transfers only a portion of a dynamic force from the engine 13 side.

In a case where the ECU 60 determines a high gear start state in step S1 (Yes in step S1), the process transitions to step S3. In step S3, the ECU 60 determines whether or not the vehicle speed V detected by the vehicle speed sensor 44 is less than the set value v2 that is set in advance (see FIG. 9). It is preferable that the set value v2 that is a criterion for determination in step S3 be set independently for each gear position of the transmission 21.

In a case where the ECU 60 determines that the vehicle speed V is equal to or greater than the set value v2 in step S3 (No in step S3), that is, in a case where acceleration is performed until the vehicle speed V is already set to be equal to or greater than the set value v2 while being a high gear start state, the process transitions to step S4. In step S4, the ECU 60 determines whether or not a difference (differential pressure) between a hydraulic pressure (current hydraulic pressure) detected by the downstream-side hydraulic pressure sensor 58 and an arithmetic operation value of a target hydraulic pressure that is set at that point in time is equal to or greater than a set value (set differential pressure) determined in advance. As a result, in a case where it is determined that the differential pressure is less than the set value (No in step S4), the process transitions to step S2, and the hydraulic pressure control unit 61 sets a target value of a hydraulic pressure to be supplied to the slave cylinder 28 to an arithmetic operation value.

In step S4, in a case where it is determined that the differential pressure is equal to or greater than the set value (Yes in step S4), the process transitions to step S5. In step S5, the hydraulic pressure control unit 61 sets the target value of a hydraulic pressure to be supplied to the slave cylinder 28 to a change rate limited arithmetic operation value limited so that the change rate of a hydraulic pressure is set to be equal to or less than a change rate determined in advance. Step S5 corresponds to the first half of state M4 in FIG. 9. When the target value of a hydraulic pressure to be supplied to the slave cylinder 28 is returned from a target hydraulic pressure upper limit value to be described later to a target hydraulic pressure calculation value by reducing the change rate of a hydraulic pressure in the first half of state M4, behavior due to a change in a clutch capacity is suppressed.

In step S3, in a case where it is determined that the vehicle speed V is less than the set value v2 (Yes in step S3), that is, in a case where the vehicle speed V is in a low state in a high gear start state, the process transitions to step S6.

In step S6, the ECU 60 determines whether or not the arithmetic operation value of a target hydraulic pressure that is set at that point in time is equal to or greater than the limit value (target hydraulic pressure upper limit value) that is set in advance. As a result, in a case where it is determined that the arithmetic operation value of a target hydraulic pressure is less than the limit value (No in step S6), the hydraulic pressure control unit 61 sets the target hydraulic pressure to the arithmetic operation value even while the vehicle speed V is in a low state in the high gear start state (step S7). Step S7 corresponds to state M2 in FIG. 9.

On the other hand, in step S6, in a case where it is determined that the arithmetic operation value of the target hydraulic pressure that is set at that point in time is equal to or greater than the limit value that is set in advance (Yes in step S6), the hydraulic pressure control unit 61 sets the target hydraulic pressure to the limit value (the target hydraulic pressure upper limit value, the second target value P2) lower than the arithmetic operation value (the target hydraulic pressure calculation value, the first target value P1) (step S8). Step S8 corresponds to state M3 in FIG. 9. As shown in FIG. 8, it is preferable that the second target value P2 be set independently for each gear position of the transmission 21.

When the target hydraulic pressure is set to the second target value P2, the clutch device 26 starts to be engaged, but a hydraulic pressure to be supplied to the slave cylinder 28 is set to be in a low state, and a clutch capacity becomes lower than in the half-clutch state during normal start. Thereby, the clutch device 26 is set to be in a state in which the amount of slippage is large, the amount of transfer of a dynamic force from the engine 13 side is reduced, and a large load is also prevented from being applied to the clutch device 26.

The second target value P2 is set so that the motorcycle 1 can travel using a driving force of the engine 13 through the clutch device 26. Thus, during setting of the second target value P2, the motorcycle 1 continues to travel even during gentler acceleration than in the half-clutch state during normal start.

In a state in which the target hydraulic pressure is set to the second target value P2 in step S8, the engine speed control unit 62 of the ECU 60 performs control so that the speed of the engine 13 is set to be less than the upper limit speed R1 (see FIG. 9) determined in advance (step S9). Thereby, the engine speed NE is prevented from excessively increasing during the high gear start state.

Next, an example of processing of bringing the indicator 49 into operation will be described.

As shown in FIG. 7, the ECU 60 determines whether or not a vehicle speed is low with respect to a gear position for each constant period of time (step S11). That is, the ECU 60 determines whether or not the gear position of the transmission 21 detected by the drum angle sensor 41 is located at a second or higher speed, and whether or not the vehicle speed V detected by the vehicle speed sensor 44 is less than the clutch release vehicle speed v1.

As a result, in a case where it is determined that the vehicle speed is low with respect to a gear position (Yes in step S11), the ECU 60 turns the indicator 49 ON (step S12), and notifies a driver of the possibility of being set to be in the high gear start state. In addition, in a case where it is determined that the vehicle speed is not low with respect to a gear position (No in step S11), that is, a case where the gear position is located at a first speed or neutral, a case where the vehicle speed V is equal to or greater than the clutch release vehicle speed v1 during deceleration, or a case where the vehicle speed V is equal to or greater than the set value v2 during acceleration, the ECU 60 turns the indicator 49 OFF (step S13). The indicator 49 operates using the clutch release vehicle speed v1 as a threshold during deceleration of the motorcycle 1, and operates using the set value v2 higher than the clutch release vehicle speed v1 as a threshold during acceleration. That is, hysteresis is imparted to a threshold of an action of the indicator 49.

Referring to FIG. 9, an example of a change of each portion when control of the control flows as shown in FIGS. 6 and 7 is executed in a case where the motorcycle 1 is traveling in reality will be described.

First, in a state in which the motorcycle 1 is traveling, when a driver closes a throttle and decelerates close to the clutch release vehicle speed v1, the clutch device 26 is set to be in a half-clutch state and prepares for stop (state M0). When the vehicle speed V decreases to less than the clutch release vehicle speed v1, the hydraulic pressure to be supplied to the slave cylinder 28 is set to 0, and the clutch device 26 is set to be in an opened state (state M1). In this case, the engine 13 is released from an engine brake and decreases the engine speed NE to an idle speed. Thereafter, the motorcycle 1 is stopped by a driver's brake operation or the like (the latter half of state M1).

Thereafter, when a driver opens a throttle in order to restart the motorcycle 1, the engine speed NE increases along with an increase in the throttle opening degree TH, and the supply of a hydraulic pressure to the slave cylinder 28 is also started (state M2). In a state in which the vehicle speed V is low, the throttle opening degree TH is small and the engine speed NE is also low, so that a gear position is determined not to be in a high gear start state even when it is located at a second or higher speed, and a slave cylinder hydraulic pressure P is set to the arithmetic operation value. The slave cylinder hydraulic pressure P is a variable increasing or decreasing in response to a clutch capacity.

In a case where the throttle opening degree TH is large and the engine speed NE also increases, a gear position is determined to be in a high gear start state when it is located at a second or higher speed, and the slave cylinder hydraulic pressure P is set to the limit value (the second target value P2) lower than the arithmetic operation value (the first target value P1) (state M3). In this case, the motorcycle 1 can travel using a driving force of the engine 13 through the clutch device 26, and an overspeed of the engine 13 is suppressed by engine control.

In this manner, in the high gear start state, traveling is possible while a large load is prevented from being applied to the clutch device 26 through the clutch capacity-limiting control in which a clutch capacity is reduced below that in half clutch control during normal start (normal clutch control), and an acceleration feeling or an increase in the engine speed NE are dulled so that a driver is allowed to recognize a high gear start state.

When the vehicle speed V of the motorcycle 1 is set to be equal to or greater than the set value v2, the slave cylinder hydraulic pressure P is set to a change rate limited arithmetic operation value so that the change rate of a hydraulic pressure is set to be equal to or less than a change rate determined in advance (the first half of state M4). Thereby, the slave cylinder hydraulic pressure P is smoothly returned from the limit value to the arithmetic operation value, and returns to normal half clutch control (the latter half of state M4). Thereafter, the slave cylinder hydraulic pressure P increases to an engagement hydraulic pressure, and the clutch device 26 is set to be in an engaged state to allow the motorcycle 1 to travel (state M5).

As described above, the vehicle transmission system of the embodiment includes the transmission 21 in which a gear is shifted by an operation of a driver of the motorcycle 1, the clutch device 26 that is disposed in a motion transfer path between the transmission 21 and the engine 13, and is disconnected and connected by an action of the clutch actuator 50, and the hydraulic pressure control unit 61 that controls disconnection and connection of the clutch device 26 by the clutch actuator 50. In a case where the motorcycle 1 is started with the gear position of the transmission 21 located at a second or higher speed, and the vehicle speed V is less than the set value v2 that is set in advance, the hydraulic pressure control unit 61 transitions to clutch capacity-limiting control in which a clutch capacity is reduced below that during normal clutch control.

Specifically, the vehicle transmission system includes the transmission 21 including the clutch device 26 operated by an action of the slave cylinder 28, the clutch actuator 50 having the master cylinder 51 that generates a hydraulic pressure in hydraulic oil, and the hydraulic pressure control unit 61 that controls transfer of a hydraulic pressure generated in the master cylinder 51 to the slave cylinder 28. In a case where the gear position of the transmission 21 is located at a second or higher speed, and the vehicle speed V is less than the set value v2 that is set in advance, the hydraulic pressure control unit 61 sets the target value of the hydraulic pressure to be supplied to the slave cylinder 28 to the second target value P2 lower than the first target value P1 in a case where the gear position of the transmission 21 is located at a first speed.

According to this configuration, in a case where the gear position of the transmission 21 is located at a second or higher speed and the vehicle speed V is equal to or less than the set value v2 that is set in advance, that is, in a case where start is attempted from a stopped state or a low-speed state in a state in which a gear is located at a second or higher speed, transition to clutch capacity-limiting control in which a clutch capacity is reduced below that during normal clutch control is performed. That is, the target value of the hydraulic pressure to be transferred to the slave cylinder 28 is set to the second target value P2 lower than the first target value P1 during normal start when a gear position is located at a first speed.

Thereby, the clutch device 26 starts to be engaged, but a clutch capacity is lower than a half-clutch state during normal start, and the amount of transfer of a dynamic force from the engine 13 side is reduced. In this manner, in a state in which a clutch capacity is low than a half-clutch state during normal start, traveling is possible while a large load is prevented from being applied to the clutch device 26, whereas an acceleration feeling expected by a driver is not obtained. Therefore, even in a case where the transmission 21 is at a high gear relative to a vehicle speed, it is possible to allow a driver to recognize start at a high gear while a large load is prevented from being applied to the clutch device 26.

In addition, in the vehicle transmission system, the second target value P2 is set so that the motorcycle 1 can travel using a driving force of the engine 13 through the clutch device 26.

According to this configuration, it is possible to allow the motorcycle 1 to continue to travel while a large load is prevented from being applied to the clutch device 26 even in a case where the transmission 21 is at a high gear relative to a vehicle speed.

In addition, in the vehicle transmission system, the second target value P2 may be set independently for each gear position of the transmission 21.

According to this configuration, it is possible to allow the motorcycle 1 to continue to travel while avoiding an overload applied to the clutch device 26 regardless of a gear position.

In addition, the vehicle transmission system further includes the engine speed control unit 62 that performs control so that the speed of the engine 13 is set to be less than the upper limit speed R1 determined in advance in a case where the hydraulic pressure control unit 61 sets the target value of the hydraulic pressure to the second target value P2.

According to this configuration, it is possible to suppress an overspeed of the engine 13 in a state in which a clutch capacity is low than a half-clutch state during normal start.

In addition, in the vehicle transmission system, the hydraulic pressure control unit 61 sets the target value of the hydraulic pressure to the first target value P1 when the vehicle speed V of the motorcycle 1 exceeds the set value v2.

According to this configuration, in a case where the vehicle speed V exceeds the set value v2 after the target value of the hydraulic pressure to be supplied to the slave cylinder 28 is set to the second target value P2, the target value of the hydraulic pressure is returned to the first target value P1, whereby it is possible to perform the same acceleration as that during normal start.

In addition, the vehicle transmission system further includes the indicator 49 that outputs information indicating that the vehicle speed is low with respect to the gear position to the outside until the motorcycle 1 is restarted and the vehicle speed V exceeds the set value v2 after the clutch device 26 is opened due to a decrease in the vehicle speed V with the gear position of the transmission 21 located at a second or higher speed.

According to this configuration, it is possible for a driver to recognize more reliably that low-speed travel at a high gear is performed.

Meanwhile, the present invention is not limited to the embodiment, and, for example, the high gear start state in which the clutch capacity-limiting control is performed may be applied to a case of an arbitrarily set high gear or above with the exception of a first speed and neutral without being limited to a case of a second or higher speed.

The application is not limited to an application to a saddle riding-type vehicle in which the clutch operation is automated as in the embodiment and can be applied also to a saddle riding-type vehicle including a so-called clutch operation-less transmission device in which transmission can be performed by adjusting a driving force without performing a manual clutch operation under a predetermined condition while the manual clutch operation is basically performed.

The present invention may be applied to a three-wheeled vehicle (including a two-front-wheeled and one-rear-wheeled vehicle in addition to one-front-wheeled and two-rear-wheeled vehicle) or a four-wheeled vehicle without being limited to application to a motorcycle.

The components in the embodiments described above are examples of the present invention, and various changes can be made in a range not departing from the concept of the prevent invention such as substitutions of constituent elements of the embodiment with known constituent elements and the like.

BRIEF DESCRIPTION OF THE REFERENCE SYMBOLS

1: Motorcycle (saddle-riding type vehicle)
13: Engine
21: Transmission
26: Clutch device
28: Slave cylinder
49: Indicator (information output unit)
50: Clutch actuator
51: Master cylinder
61 Hydraulic pressure control unit (clutch control unit)
62 Engine speed control unit
P1: First target value
P2: Second target value
R1: Upper limit speed
V: Vehicle speed
v2: Set value

What is claimed is:

1. A saddle-riding type vehicle transmission system comprising:
   a transmission in which a gear is shifted by an operation of a driver of a saddle-riding type vehicle;
   a clutch device that is disposed in a motion transfer path between the transmission and an engine of the saddle-riding type vehicle, and is disconnected and connected by an action of a clutch actuator;
   a clutch control unit that is configured to control disconnection and connection of the clutch device by the clutch actuator; and
   an engine speed control unit that controls a speed of the engine to be less than or no higher than an upper limit speed determined in advance so that an overspeed of the engine does not occur due to slippage of the clutch device through clutch capacity-limiting control,
   wherein
   in a case where the saddle-riding type vehicle is started with a gear position of the transmission located at or above a second gear, and a vehicle speed is less than or no higher than a set value that is set in advance, the clutch control unit transitions to the clutch capacity-limiting control in which a clutch capacity is reduced below that during clutch control during normal start when the gear position is located at a first speed.

2. The saddle-riding type vehicle transmission system according to claim 1, wherein:
   the clutch actuator includes a master cylinder that is configured to generate a hydraulic pressure,
   the clutch device is disconnected and connected by an action of a slave cylinder to which a hydraulic pressure is supplied from the master cylinder, and
   the clutch control unit is configured to set a target value of a hydraulic pressure to be supplied from the master cylinder to the slave cylinder, in the clutch capacity-limiting control, to a second target value lower than a first target value in a case where the gear position of the transmission is located at a first speed.

3. The saddle-riding type vehicle transmission system according to claim 2, wherein the second target value is set so that the saddle-riding type vehicle is able to travel using a driving force of the engine through the clutch device.

4. The saddle-riding type vehicle transmission system according to claim 2, wherein the second target value is set independently for each gear position of the transmission.

5. The saddle-riding type vehicle transmission system according to claim 2, further comprising the engine speed control unit that performs control so that a speed of the engine is set to be less than or no higher than the upper limit speed determined in advance in a case where the clutch control unit is configured to set the target value of the hydraulic pressure to the second target value.

6. The saddle-riding type vehicle transmission system according to claim 2, wherein the clutch control unit returns a target value of a hydraulic pressure to be supplied to the slave cylinder from the second target value to the first target value when the vehicle speed is equal to or greater than the set value that is set in advance.

7. The saddle-riding type vehicle transmission system according to claim 1, further comprising an information output unit that is configured to output information indicating that the vehicle speed is low with respect to the gear position to an outside until the saddle-riding type vehicle is restarted and the vehicle speed exceeds the set value after the clutch device is opened due to a decrease in the vehicle speed with the gear position of the transmission located at or above the gear that is set in advance.

* * * * *